(12) United States Patent
Hanada

(10) Patent No.: US 10,275,093 B2
(45) Date of Patent: Apr. 30, 2019

(54) IMAGE DISPLAY APPARATUS, IMAGE DISPLAY APPARATUS CONTROLLING METHOD, AND NON-TRANSITORY RECORDING MEDIUM

(71) Applicant: Hiroaki Hanada, Kanagawa (JP)

(72) Inventor: Hiroaki Hanada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 15/624,820

(22) Filed: Jun. 16, 2017

(65) Prior Publication Data

US 2018/0004352 A1 Jan. 4, 2018

(30) Foreign Application Priority Data

Jul. 4, 2016 (JP) .................................. 2016-132735

(51) Int. Cl.
*G06F 3/038* (2013.01)
*G06F 3/041* (2006.01)
*G06F 3/0354* (2013.01)

(52) U.S. Cl.
CPC ............ *G06F 3/0418* (2013.01); *G06F 3/038* (2013.01); *G06F 3/03545* (2013.01); *G06F 3/0412* (2013.01); *G06F 2203/04105* (2013.01)

(58) Field of Classification Search
CPC ......... G06F 2203/04105; G06F 3/0412; G06F 3/038; G06F 3/0418; G06F 3/03545
See application file for complete search history.

(56) References Cited

U.S. PATENT DOCUMENTS

| 6,232,962 | B1* | 5/2001 | Davis | G06F 3/03545 |
| | | | | 178/18.04 |
| 2014/0118312 | A1* | 5/2014 | Oyama | G06F 3/038 |
| | | | | 345/179 |
| 2014/0225846 | A1* | 8/2014 | Ishida | G06K 9/222 |
| | | | | 345/173 |

FOREIGN PATENT DOCUMENTS

JP 2011-227580 11/2011

\* cited by examiner

*Primary Examiner* — Muhammad N Edun
(74) *Attorney, Agent, or Firm* — Cooper & Dunham LLP

(57) ABSTRACT

An image display apparatus includes a sensor, circuitry, and a display. The sensor measures a writing pressure of a user in response to handwriting input performed on an input device by the user. The circuitry determines a width of a line based on the measured writing pressure of the user. The display displays the line with the determined width as a trajectory of the handwriting input performed on the input device by the user. The circuitry sets a correction value for the width of the line at each of a plurality of predetermined positions of the trajectory of the handwriting input by the user in response to input from the user, and corrects the width of the line based on the set correction value.

9 Claims, 9 Drawing Sheets

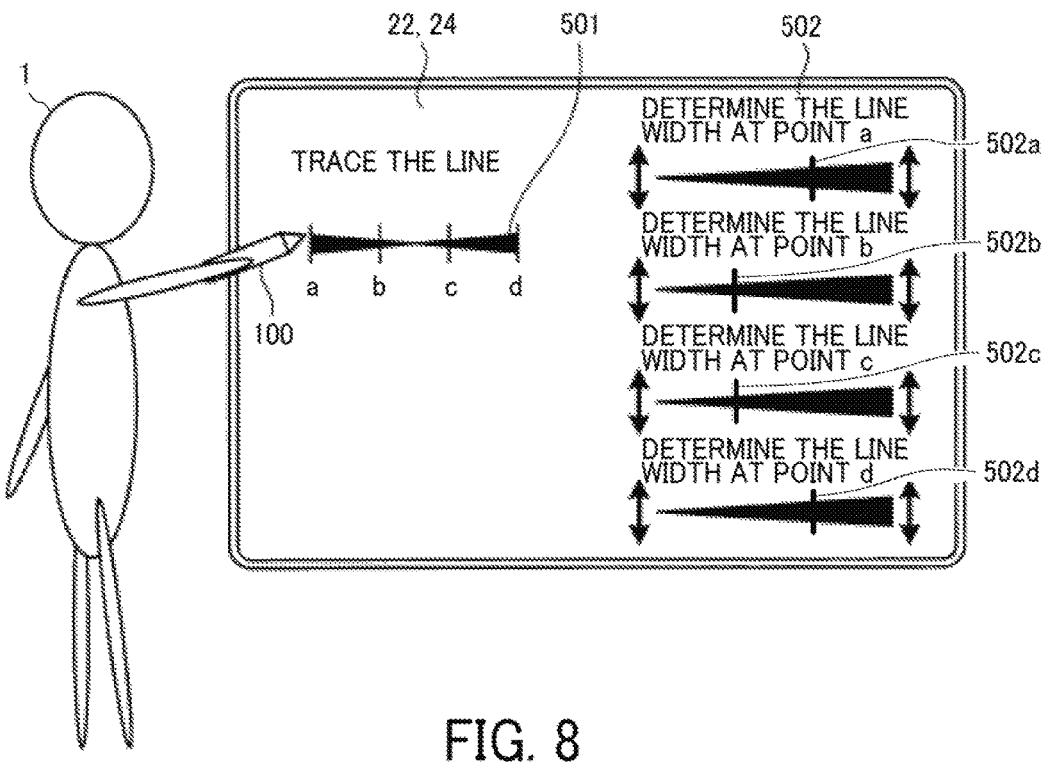

IMAGE DISPLAY APPARATUS, IMAGE DISPLAY APPARATUS CONTROLLING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2016-132735 filed on Jul. 4, 2016, in the Japan Patent Office, the entire disclosure of which is hereby incorporated by reference herein.

BACKGROUND

Technical Field

The present invention relates to an image display apparatus, an image display apparatus controlling method, and a non-transitory recording medium.

Description of the Related Art

At meetings in companies, educational institutions, and administrative agencies, for example, an image display apparatus such as an electronic information board has been used which allows a user to write a character or draw a figure, for example, on a background image displayed on a display of the image display apparatus. Such an image display apparatus includes an electronic pen equipped with a pressure sensor to change the line width of the trajectory of a stroke displayed on the display in accordance with the writing, pressure applied by the user (i.e., a writer or a drawer), e.g., to increase the line width in accordance with the increase in the writing pressure.

SUMMARY

In one embodiment of this invention, there is provided an improved image display apparatus that includes, for example, a sensor, circuitry, and a display. The sensor measures a writing pressure of a user in response to handwriting input performed on an input device by the user. The circuitry determines a width of a line based on the measured writing pressure of the user. The display displays the line with the determined width as a trajectory of the handwriting input performed on the input device by the user. The circuitry sets a correction value for the width of the line at each of a plurality of predetermined positions of the trajectory of the handwriting input by the user in response to input from the user, and corrects the width of the line based on the set correction value.

In one embodiment of this invention, there is provided an improved image display apparatus controlling method that includes, for example, measuring a writing pressure of a user in response to handwriting input performed by the user, acquiring a width of a line set by the user, calculating a writing pressure correction value for the user based on a difference between the acquired width of the line and a width of the line based on the measured writing pressure, acquiring a minimum value and a maximum value of the width of the line input by the user, and storing the calculated writing pressure correction value for the user and the minimum value and the maximum value of the width of the line for the user.

In one embodiment of this invention, there is provided a non-transitory recording medium storing a program for causing a computer to execute the above-described image display apparatus controlling method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of a screen displayed during the execution of the first calibration according to the embodiment;

FIG. 8 is a table illustrating an example of line widths for different writing pressures set in the electronic information board according to the embodiment;

FIG. 9 is a table illustrating an example of writing pressure correction values for different users according to the embodiment;

Figure 1:
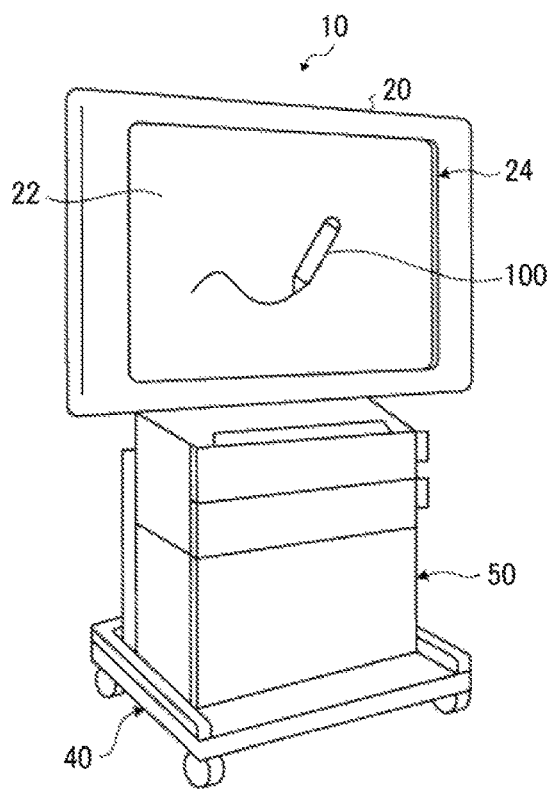
FIG. 1 is a diagram illustrating an example of the general arrangement of an electronic information board according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the accompanying drawings, wherein like reference numerals designate identical or corresponding parts throughout the several views, embodiments of the present invention will be described in detail.

An electronic information board 10 is an image display apparatus according to an embodiment of the present invention. The electronic information board 10 sets (i.e., calibrates) a writing pressure correction value and minimum and maximum line width values for each user to display the line intended by the user when the user performs handwriting input on the electronic information board 10.

A general arrangement of the electronic information board 10 according to the present embodiment will first be described.

FIG. 1 is a diagram illustrating an example of the general arrangement of the electronic information board 10 according to the present embodiment. As illustrated in FIG. 1, the electronic information board 10 according to the present embodiment includes a display 20 including a display screen 22 and a touch panel 24, a stand 40 that holds the display 20, and an equipment storage unit 50 that stores peripheral equipment.

The display 20 includes a flat panel, such as a liquid crystal panel or a plasma panel. The display screen 22, which displays an image, and the touch panel 24 are formed on a front surface of a housing of the display 20.

The touch panel 24 is an input device integrally formed on the display screen 22 to detect position coordinates of a contact point of an electronic pen 100 contacting the touch panel 24, to thereby receive the handwriting input performed by the user. In the display 20, the display screen 22 performs a display function, and the touch panel 24 performs an input function.

Specifically, the touch panel 24 detects the position coordinates of the contact point of the electronic pen 100 brought into contact with the touch panel 24 by the user, to thereby acquire a trajectory drawn on the touch panel 24 by the user with the electronic pen 100. The touch panel 24 of the electronic information board 10 according to the present embodiment may employ an optical system, an electrostatic capacitance system, or an electromagnetic induction system, for example. The touch panel 24 is an example of an input device according to the present embodiment.

The display screen 22 displays an image acquired from a personal computer (PC) or a character or a figure, for example, written or drawn on the touch panel 24 by the user. Specifically, if the user draws a trajectory on the touch panel 24 while keeping the electronic pen 100 in contact with the touch panel 24, the display screen 22 displays a line at a place indicated by the position coordinates detected by the touch panel 24 as the trajectory of the handwriting input performed by the user. The display screen 22 is an example of a display according to the present embodiment.

The electronic pen 100 is an example of a stylus pen used by the user to operate the touch panel 24. The electronic pen 100 may be any stylus pen allowing the touch panel 24 to detect the position coordinates of the contact point. For example, if the touch panel 24 employs an optical system, a light-emitting pen that emits light to allow the touch panel 24 to detect the position coordinates of the contact point is adopted as the electronic pen 100. Further, the electronic pen 100 may be configured to be compatible with the electrostatic capacitance system or the electromagnetic induction system, for example, in accordance with the type of the touch panel 24. The electronic pen 100 is equipped with a pressure sensor 101 illustrated in FIG. 3, which measures the writing pressure of the user.

The connection between the electronic information board 10 and the peripheral equipment, for example, will be described.

Figure 2:
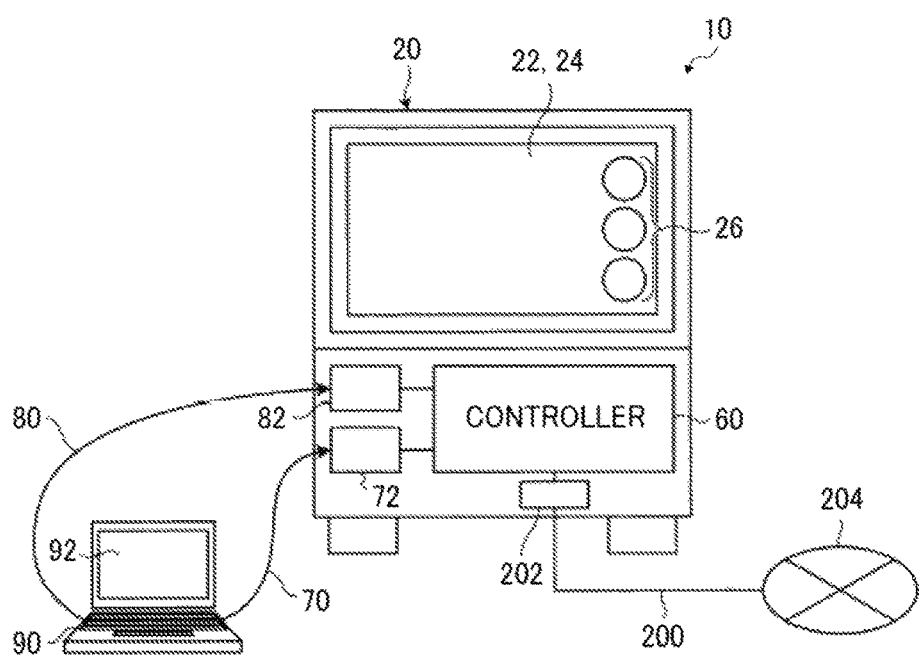
FIG. 2 is a diagram illustrating an example of connection between the electronic information board according to the embodiment and peripheral equipment, for example.

FIG. 2 is a diagram illustrating an example of the connection between the electronic information board 10 according to the present embodiment and the peripheral equipment, for example. As illustrated in FIG. 2, the electronic information board 10 according to the present embodiment is connectable to a PC 90 and a network 204 such as the Internet or a local area network (LAN).

The electronic information board 10 according to the present embodiment further includes a controller 60, a universal serial bus (USB) socket 72, and a video graphics array (VGA) input socket 82. The controller 60 controls the entire electronic information board 10. The USB socket 72 and the VGA input socket 82 interface with an external device.

The electronic information board 10 and the PC 90 are connected to each other via a USB cable 70 connected to the USB socket 72 and a VGA cable 80 connected to the VGA input socket 82. Alternatively, the electronic information board 10 and the PC 90 may be connected to each other with cables and connectors based on another communication standard or by wireless communication.

Further, the electronic information board 10 may be connected to the network 204 by wired or wireless communication via a communication line 200, such as an optical fiber, and a network socket 202.

The PC 90 has a hardware configuration of a normal computer, which includes a control device such as a central processing unit (CPU), storage devices such as a read-only memory (ROM) and a random access memory (RAM), a hard disk drive (HDD), an external storage device such as a compact disc (CD) drive device, a display device, and input devices such as a keyboard and a mouse. The PC 90 is an example of an external computer, and may be replaced by a tablet terminal, for example.

The controller 60 of the electronic information board 10 controls the entire electronic information board 10, and controls transmission and reception of data to and from the PC 90 and the network 204 connected to the electronic information board 10. For example, if the image data of the image displayed on a monitor 92 of the PC 90 is transferred to the electronic information board 10 via the USB cable 70 or the VGA cable 80, the controller 60 causes the display screen 22 of the display 20 to display the image displayed on the monitor 92. Further, if connected to a computer at a remote site via the network 204, for example, the controller 60 allows the electronic information board 10 to be used in a meeting between remote sites.

The controller 60 further controls the display screen 22 and the touch panel 24 of the display 20. Specifically, the controller 60 acquires the position coordinates of the contact point of the electronic pen 100 detected by the touch panel 24, and displays a line on the display screen 22 as a trajectory drawn by the user. Further, if the user performs a screen operation, such as pressing one of various screen operation units 26 on the display screen 22 with the electronic pen 100, the controller 60 changes the image displayed on the display screen 22 based on the screen operation performed on the touch panel 24 by the user.

The screen operation units 26 are operation buttons displayed on the display screen 22 of the display 20. The screen operation units 26 display processes available to the user. The user presses one of the screen operation units 26 with the electronic pen 100 to operate the electronic information board 10.

The relationship between the electronic information board 10 and the electronic pen 100 will be described with reference to FIG. 3.

Figure 3:
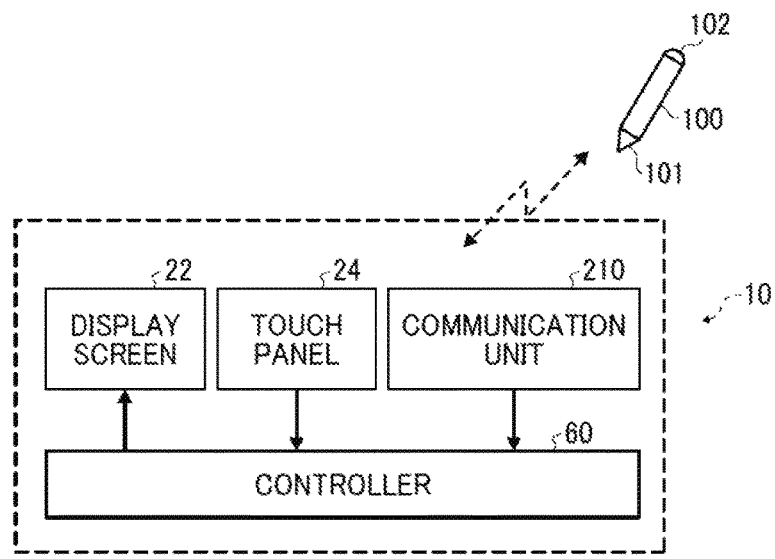
FIG. 3 is a diagram illustrating an example of wireless communication between the electronic information board and an electronic pen according to the embodiment.

FIG. 3 is a diagram illustrating an example of wireless communication between the electronic information board 10 and the electronic pen 100 according to the present embodiment. As illustrated in FIG. 3, the electronic information board 10 includes a communication unit 210 to transmit and receive signals to and from the electronic pen 100, and the electronic pen 100 includes a communication unit 102 to transmit and receive signals to and from the electronic information board 10.

In the present embodiment, the electronic pen 100 includes the pressure sensor 101 in a tip portion thereof. The pressure sensor 101 measures the writing pressure of the user when the user performs handwriting input on the touch panel 24. The electronic pen 100 transmits the measured writing pressure to the communication unit 210 of the electronic information board 10 from the communication unit 102. The pressure sensor 101 is an example of a sensor according to the present embodiment.

The communication unit 210 transmits the writing pressure acquired from the electronic pen 100 to the controller 60. The controller 60 acquires from the touch panel 24 the position coordinates of the contact point of the electronic pen 100 contacting the touch panel 24.

Based on the writing pressure acquired from the electronic pen 100 and the position coordinates of the contact point of the electronic pen 100 acquired from the touch panel 24, the controller 60 detects the writing pressure and the position coordinates of the line drawn on the touch panel 24 by the user. The controller 60 displays a line on the display screen 22 at the position coordinates at which the contact of the electronic pen 100 has been detected. In accordance with an increase in the writing pressure at the position coordinates of the contact point, the controller 60 increases the line width of the line to be displayed.

A hardware configuration of the electronic information board 10 according to the present embodiment will be described.

Figure 4:
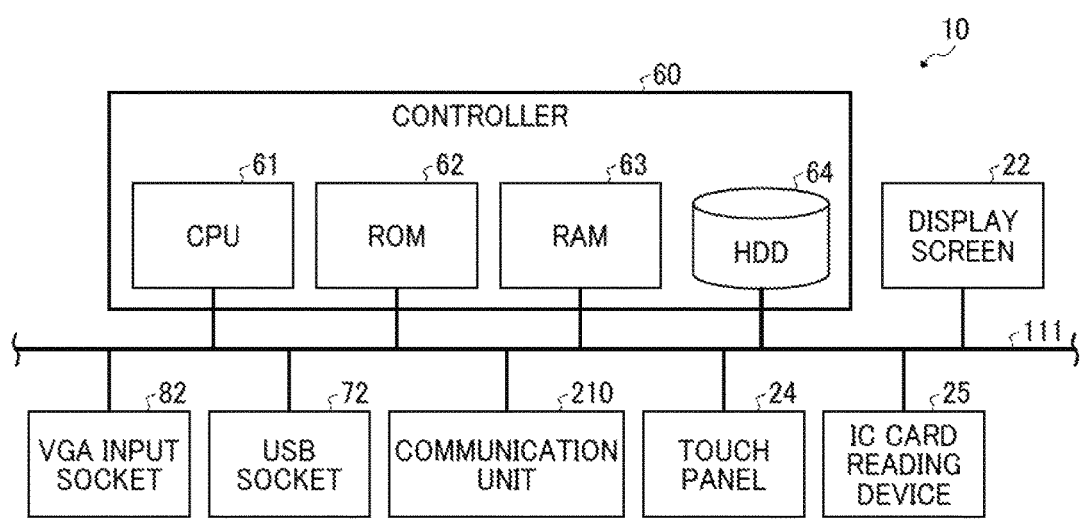
FIG. 4 is a diagram illustrating an example of the hardware configuration of the electronic information board according to the embodiment.

FIG. 4 is a diagram illustrating an example of the hardware configuration of the electronic information board 10 according to the present embodiment. As illustrated in FIG. 4, the controller 60 of the electronic information board 10 includes a CPU 61, a ROM 62, a RAM 63, and an HDD 64. In the electronic information board 10, the CPU 61, the ROM 62, the RAM 63, the HDD 64, the display screen 22, the USB socket 72, the VGA input socket 82, the communication unit 210, the touch panel 24, an integrated circuit (IC) card reading device 25 are connected to a bus 111.

In the controller 60, the ROM 62 stores a control program. The CPU 61 controls the processing of the electronic information board 10 in accordance with the control program stored in the ROM 62. The RAM 63 is used as a working memory during the processing of the CPU 61. The HDD 64 stores values of standard settings of the line width set in the electronic information board 10 and values set in calibration of the line width performed by the user.

In the electronic information board 10, the IC card reading device 25 acquires identification information of the user. The user of the electronic information board 10 has an IC card 400 illustrated in FIG. 5, on which the identification information of the user such as user identification (ID) is recorded. The user holds the IC card 400 above the IC card reading device 25 to log in the electronic information board 10. The IC card 400 may be replaced by a user ID input button or a configuration that uniquely identifies the user by biometrics, for example. With the acquired identification information of the user, the electronic information board 10 applies different display settings to different users.

Figure 5:
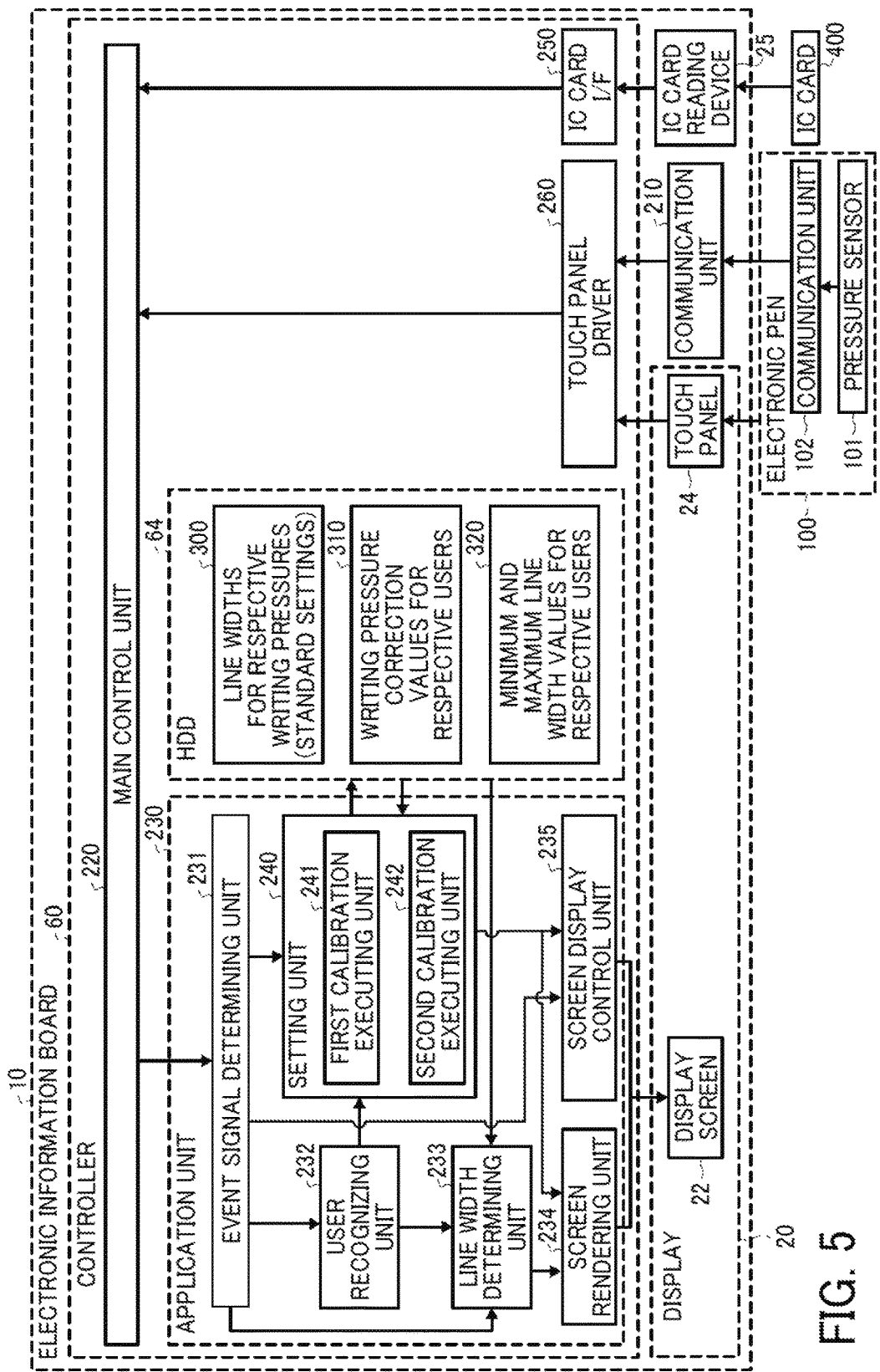
FIG. 5 is a functional block diagram illustrating an example of the functional configuration of the electronic information board according to the embodiment.

FIG. 5 is a functional block diagram illustrating an example of the functional configuration of the electronic information board 10 according to the present embodiment. As illustrated in FIG. 5, the controller 60 of the electronic information board 10 includes a main control unit 220, an application unit 230, the HDD 64, a touch panel driver 260, and an IC card interface (I/F) 250. The controller 60 transmits and receives signals to and from the display screen 22 and the touch panel 24 of the display 20, and acquires signals from the communication unit 210 and the IC card reading device 25.

The illustration of the ROM 62, the RAM 63, the USB socket 72, and the VGA input socket 82 of the electronic information board 10 illustrated in FIG. 4 is omitted in FIG. 5. As well as the functional units illustrated in FIG. 5, a functional unit that controls the display of the image acquired from the PC 90, for example, is also included in the electronic information board 10.

As illustrated in FIG. 5, the HDD 64 stores line widths 300 for respective writing pressures, writing pressure correction values 310 for respective users, and minimum and maximum line width values 320 for respective users (hereinafter simply referred to as the line widths 300, the writing pressure correction values 310, and the minimum and maximum line width values 320). The line widths 300 are information of line widths associated with writing pressures and previously registered in the electronic information board 10 as the standard settings. The writing pressure correction values 310 and the minimum and maximum line width values 320 are registered information of settings individually set for each of the users. The settings of the writing pressure correction values 310 and the minimum and maximum line width values 320 are registered through the calibration of the line width executed by the user.

As illustrated in FIG. 5, the main control unit 220 controls the entire processing of the controller 60. The main control unit 220 acquires a signal received from an external device by the touch panel driver 260 or the IC card I/F 250, and transmits an event signal to the application unit 230 to control the processing of the controller 60.

The touch panel driver 260 is a device driver that controls the touch panel 24 and the electronic pen 100. The touch panel driver 260 acquires the position coordinates of the contact point of the electronic pen 100 from the touch panel 24.

The pressure sensor 101 of the electronic pen 100 measures the value of the writing pressure applied during the handwriting input performed on the touch panel 24 by the user. The measured writing pressure is transmitted from the communication unit 102 of the electronic pen 100 to the communication unit 210 of the electronic information board 10.

The communication unit 210 of the electronic information board 10 transmits the writing pressure of the user acquired from the communication unit 102 of the electronic pen 100 to the touch panel driver 260.

The touch panel driver 260 acquires, via the communication unit 210, the writing pressure of the user measured by the pressure sensor 101 of the electronic pen 100. The touch panel driver 260 converts the writing pressure and the position coordinates of the contact point of the electronic pen 100 into a predetermined event signal, and transmits the event signal to the main control unit 220.

If the user presses one of the screen operation units 26 on the touch panel 24 with the electronic pen 100, the touch panel driver 260 transmits an event signal according to the pressed screen operation unit 26 (i.e., an operation button) to the main control unit 220.

The IC card I/F 250 acquires from the IC card reading device 25 the identification information of the user recorded on the IC card 400. The IC card 250 transmits the acquired identification information of the user to the main control unit 220.

The application unit 230 is implemented by, for example, software that performs a variety of processes for realizing the functions of the electronic information board 10. The application unit 230 includes an event signal determining unit 231, a user recognizing unit 232, a line width determining unit 233, a screen rendering unit 234, a screen display control unit 235, and a setting unit 240.

The event signal determining unit 231 monitors the event signal input from the main control unit 220 to perform a control process in accordance with the input event signal.

The user recognizing unit 232 acquires the identification information of the user, which is acquired by the IC card I/F 250, from the main control unit 220 via the event signal determining unit 231. If the user calibrates the line width, the user recognizing unit 232 transmits the acquired identification information of the user to the setting unit 240. If the user performs the operation of writing a character or drawing a figure, for example, on the touch panel 24 of the electronic information board 10, the user recognizing unit 232 transmits the acquired identification information of the user to the line width determining unit 233. In the present embodiment, the identification information of the user is the user ID.

The setting unit 240 individually sets, for each of the users, the display setting of the width of the line to be displayed on the display screen 22. As illustrated in FIG. 5, the setting unit 240 includes a first calibration executing unit 241 and a second calibration executing unit 242.

The process of first calibration executed by the first calibration executing unit 241 will be specifically described with reference to FIGS. 6A and 6B.

Figure 6A:
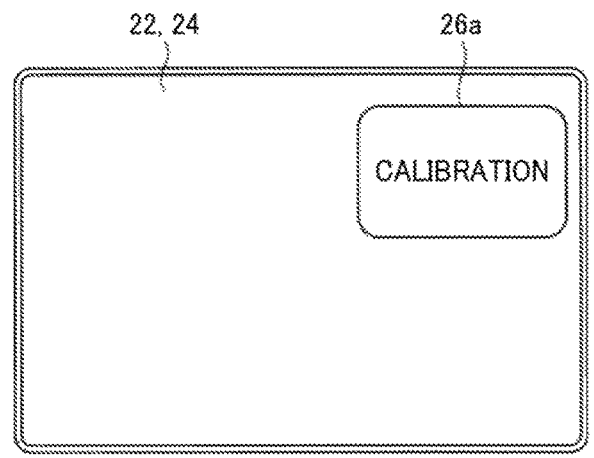
FIGS. 6A and 6B are diagrams illustrating an example of a setting screen for first calibration according to the embodiment.
Figure 6B:
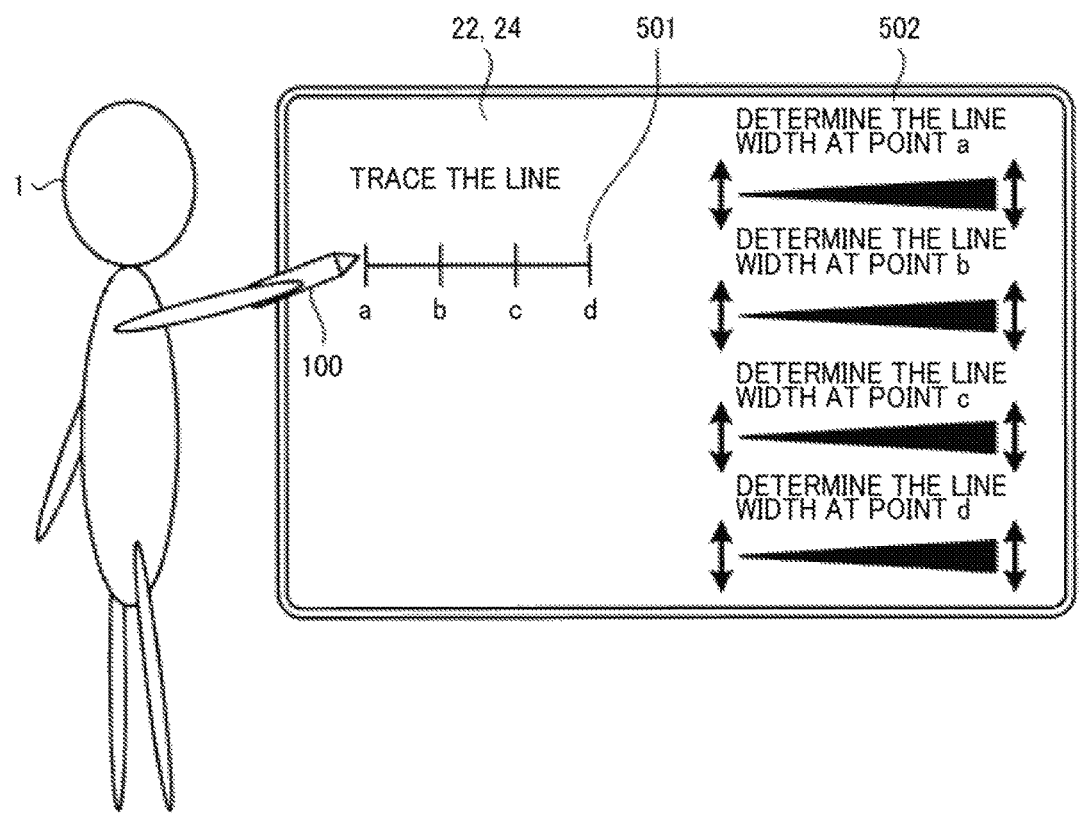

FIGS. 6A and 6B are diagrams illustrating an example of a setting screen for the first calibration according to the present embodiment.

FIG. 6A illustrates an example of an initial screen displayed on the display screen 22 after the start-up of the electronic information board 10. A calibration button 26a illustrated in FIG. 6A is one of the screen operation units 26. If the user presses the calibration button 26a with the electronic pen 100, the first calibration executing unit 241 of the setting unit 240 starts the first calibration in response to the event signal received from the event signal determining unit 231.

FIG. 6B illustrates an example of the setting screen for the first calibration. The setting screen for the first calibration displays a line width display field 501 and a line width adjustment field 502.

The line width display field 501 is an input area in which a user 1 inputs a trajectory by handwriting with the electronic pen 100. The trajectory drawn by the user 1 is displayed as a line in the line width display field 501 at the position coordinates at which the user 1 has drawn the trajectory.

The line width adjustment field 502 is an area in which the user 1 inputs a desired line width to set the correction value for the line width.

Specifically, the user 1 inputs a trajectory by handwriting in a predetermined area of the line width display field 501 with the electronic pen 100. The touch panel 24 detects the position coordinates of the trajectory drawn by the user 1, and the pressure sensor 101 of the electronic pen 100 measures the writing pressure of the user 1. The first calibration executing unit 241 acquires from the event signal determining unit 231 the event signal representing the writing pressure and the position coordinates of the trajectory drawn by the user 1.

The first calibration executing unit 241 controls the screen rendering unit 234 to display a line in the line width display field 501 as the trajectory drawn by the user 1.

FIG. 7 is a diagram illustrating an example of a screen displayed during the execution of the first calibration according to the present embodiment. The line representing the trajectory drawn on the touch panel 24 by the user 1 in FIG. 6B is displayed in the line width display field 301 FIG. 7.

In this case, the first calibration executing unit 241 changes the width of the line to be displayed in accordance with the writing pressure of the user 1 based on the standard settings of the electronic information board 10. Specifically, the first calibration executing unit 241 acquires the line width corresponding to the writing pressure of the user 1 with reference to the line widths 300 stored in the HDD 64.

FIG. 8 is a table illustrating an example of the line widths 300 set in the electronic information board 10 according to the present embodiment. As illustrated in FIG. 8, the line widths 300 are a table of line widths associated with writing pressures. The line widths 300 are preset in the electronic information board 10. The values set in the line widths 300 in FIG. 8 are illustrative, and the values of the writing pressure and the line width are not limited thereto.

As illustrated in FIG. 8, the line widths 300 are defined to increase the width of the line to be displayed in accordance with the increase in the writing pressure. For example, if the user 1 draws a line with a writing pressure of 50 grams-force (gf), a line with a width of 0.5 cm is displayed. Further, if the user 1 draws a line with a writing pressure of 100 gf, a line with a width of 1 cm is displayed.

According to the standard settings of the electronic information board 10 of the present embodiment, if the writing pressure of the user 1 is lower than a predetermined threshold, the line drawn by the user 1 is not displayed on the display screen 22 in consideration of, for example, the possibility of unintentional contact on the touch panel 24 by the user 1. For example, in the present embodiment, if the writing pressure of the user 1 is 10 gf or less, the line width corresponding to this writing pressure is 0 cm, as illustrated in FIG. 8. In this case, the line drawn by the user 1 is not displayed on the display screen 22.

In FIG. 7, the line displayed in the line width display field 501 is thick in a beginning portion and an end portion of the line and thin in an intermediate portion of the line. This is because the user 1 has drawn the line by increasing the writing pressure in the beginning portion and the end portion and reducing the writing pressure in the intermediate portion.

The user 1 is allowed to adjust the thus-determined line width by operating the line width adjustment field 502 in the setting screen for the first calibration.

The adjustment of the line width performed by the user 1 will be specifically described.

As illustrated in FIG. 7, the line width display field 501 displays scale marks at four points a, b, c, and d. The point a represents the position of a beginning portion of the trajectory drawn by the user 1, and the point b represents the position corresponding to one-third of the trajectory drawn by the user 1 from the beginning portion of the trajectory. Further, the point c represents the position corresponding to two-thirds of the trajectory drawn by the user 1 from the beginning portion of the trajectory, and the point d represents the position of an end portion of the trajectory drawn by the user 1. The points a to d are an example of predetermined positions of the present embodiment. The predetermined positions include the respective positions of at least a beginning portion, an intermediate portion, and an end portion of the line of the trajectory drawn by the user 1, and are not limited to the positions of the above-described four points a, b, c, and d.

The line width adjustment field 502 in FIG. 7 displays scale marks 502a, 502b, 502c, and 502d for adjusting the line width at each of the positions of the points a, b, c, and d. Each of the displayed scale marks 502a, 502b, 502c, and 502d indicates the line width at the position of the corresponding one of the points a, b, c, and d. The user 1 operates the scale marks 502a, 502b, 502c, and 502d in the line width adjustment field 502 to adjust the line width at each of the positions of the points a, b, c, and d in the line width display field 501 to set the desired line width.

Specifically, the user 1 operates the scale mark 502a with the electronic pen 100 to change the line width at the position of the point a to the desired line width. The line width set with the scale mark 502a by the user 1 is reflected in the line width at the point a in the line width display field 501. The user 1 is allowed to operate the scale marks 502a to 502d in the line width adjustment field 502 while checking the change in the width of the line displayed in the line width display field 501.

At each of the positions of the points a to d, the difference between the line width determined based on the standard settings and displayed in the line width display field 501 before the change in line width made by the user 1 and the desired line width set by the user 1 corresponds to the value by which the line width is to be corrected at the position. The first calibration executing unit 241 acquires the desired line width set by the user 1, and calculates the value by which the line width is to be corrected at each of the positions of the points a to d. The first calibration executing unit 241 then calculates a writing pressure correction value for correcting the writing pressure of the user 1 to display the line width expected by the user 1 at each of the positions of the points a to d. The writing pressure correction value is an example of a correction value of the present embodiment.

The calculation of the writing pressure correction value will be specifically described with reference to FIG. 9.

FIG. 9 is a table illustrating an example of the writing pressure correction values 310 according to the present embodiment. As illustrated in FIG. 9, the writing pressure correction values 310 are a table of writing pressure correction values set at the positions of the points a to d for respective user IDs.

For example, if the writing pressure of the user 1 is 100 gf at the point a, the line width determined based on the standard settings is 1 cm, as illustrated in FIG. 8. It is assumed here that the user 1 sets the scale mark 502a to the position corresponding to a line width of 0.5 cm as the line width desired at the point a.

As illustrated in FIG. 8, the line is displayed with the width of 0.5 cm when the writing pressure is 50 gf. Therefore, the difference between the writing pressure of 100 gf actually applied by the user 1 and the writing pressure 50 gf corresponding to the desired line width is −50 gf. In this case, −50 is set as the writing pressure correction value at the point a, as illustrated in the row of user ID "AA" in FIG. 9.

As for the line width at each of the positions of the other points b to d, the user 1 operates the corresponding one of the scale marks 502b to 502d in a similar manner to adjust the line width. The first calibration executing unit 241 calculates the writing pressure correction values for correcting the writing pressures of the user 1 at the respective positions of the points a to d, and sets the calculated writing pressure correction values in the writing pressure correction values 310.

That is, in accordance with the input from the user 1, the first calibration executing unit 241 sets the correction value for the line width at a predetermined position of the trajectory drawn by the user 1. The first calibration executing unit 241 calculates the writing pressure correction value at each of the positions of the points a to d based on the difference between the line width determined based on the actual writing pressure of the user 1 and the desired line width set by the user 1. The first calibration executing unit 241 sets the calculated writing pressure correction value for the user 1, i.e., individually sets the writing pressure correction value for each of the users.

The process of the first calibration is completed when the user 1 presses a complete button with the electronic pen 100. After the completion of the process of the first calibration, the process of second calibration starts. Alternatively, upon lapse of a predetermined time after the user 1 sets the line widths at the respective positions of the points a to d on the setting screen for the first calibration, the process of the first calibration may be completed to proceed to the process of the second calibration.

Referring back to FIG. 5, the second calibration executing unit 242 individually sets the minimum value and the maximum values of the line width for each of the users.

The process executed by the second calibration executing unit 242 will be specifically described with reference to FIG. 10.

Figures 10, 11:
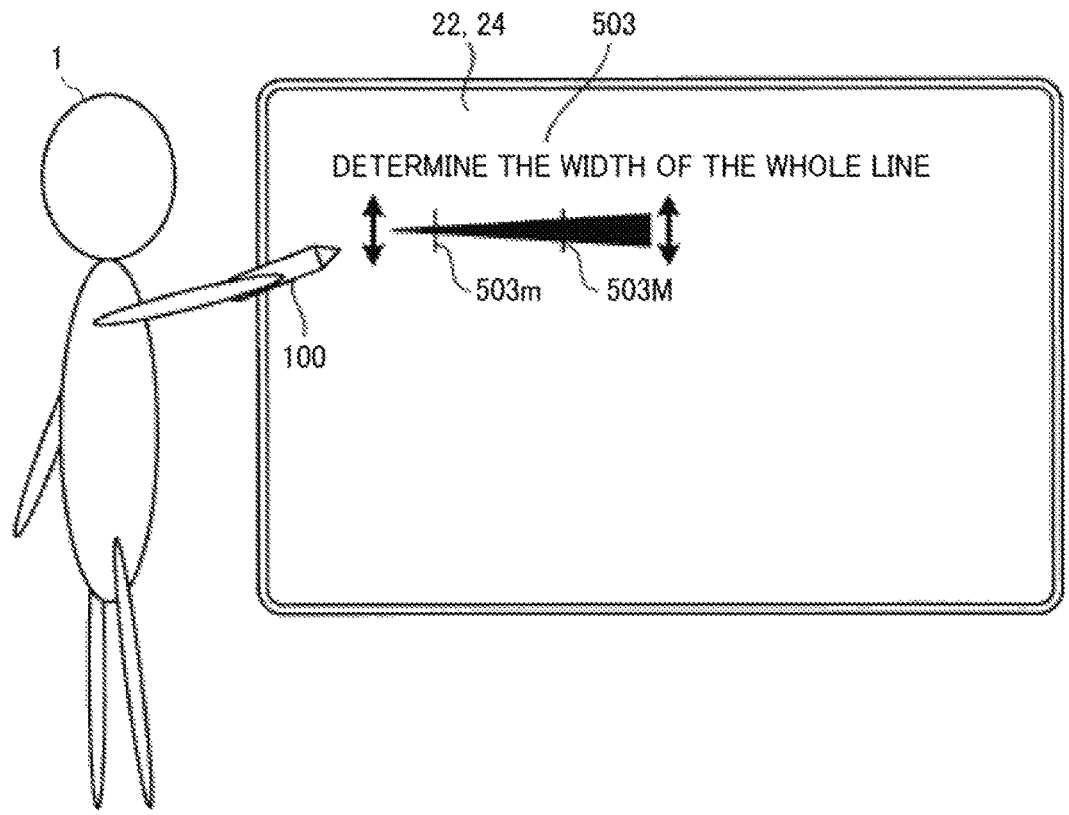
FIG. 10 is a diagram illustrating an example of a setting screen for second calibration according to the embodiment.
FIG. 11 is a table illustrating an example of minimum and maximum line width values for different users according to the embodiment.

FIG. 10 is a diagram illustrating an example of a setting screen for the second calibration according to the present embodiment. A line width setting field 503 in FIG. 10 is a screen that receives an operation for setting in the electronic information board 10 the minimum value and the maximum value of the line width for the user 1, i.e., for each of the users. In FIG. 10, a scale mark 503m indicates the minimum value of the line width, and a scale mark 503M indicates the maximum value of the line width.

The user 1 operates the scale marks 503m and 503M with the electronic pen 100 to set each of the minimum value and the maximum value of the line width to a desired value. The second calibration executing unit 242 acquires the minimum value and the maximum value of the line width set by the user 1 as the minimum value and the maximum value of the line width set for the user 1. That is, the second calibration executing unit 242 sets the minimum value and the maximum value of the line width in accordance with the input from the user 1.

In the electronic information board 10 according to the present embodiment, the width of the line to be displayed changes in accordance with the intensity of the writing pressure of the user 1, i.e., the width of the line to be displayed is reduced in accordance with the reduction in the writing pressure of the user 1. Further, the standard settings are previously determined, as described above, so as not to display a line when the writing pressure of the user 1 is lower than the predetermined threshold in consideration of the possibility of unintentional contact on the touch panel 24 by the user 1.

In the electronic information board 10 according to the present embodiment, the user 1 executes the second calibration to set the minimum value and the maximum value of the line width. With the minimum value of the line width set by the user 1, a line with the line width set to the minimum value is displayed on the display screen 22 irrespective of the writing pressure of the user 1, as long as the contact of the electronic pen 100 is detected by the touch panel 24. Further, with the maximum value of the line width set by the user 1, a line with a line width exceeding the set maximum value will not be displayed on the display screen 22, even if the writing pressure of the user 1 is increased.

The minimum value and the maximum value of the line width will be specifically described with reference to FIG. 11.

FIG. 11 is a tale illustrating an example of the minimum and maximum line width values 320 according to the present embodiment. As illustrated in FIG. 11, the minimum and maximum line width values 320 are a table of minimum values and maximum values of the line width set for the respective user IDs.

If the user 1 sets the scale mark 503m for the minimum value of the line width to 0.5 cm on the setting screen for the second calibration in FIG. 10, the minimum value of the line width for the user 1 is set to 0.5 cm, as illustrated in the row of user ID "AA" in FIG. 11. In this case, the display screen 22 displays the line with the line width of 0.5 cm set as the minimum value, even if the writing pressure of the user 1 falls below the predetermined threshold, as long as the contact of the electronic pen 100 is detected by the touch panel 24.

Further, if the user 1 sets the scale mark 503M for the maximum value of the line width to 2 cm on the setting screen for the second calibration in FIG. 10, the maximum value of the line width for the user 1 is set to 2 cm, as illustrated in the row of user ID "AA" in FIG. 11. In this case, the display screen 22 displays the line with the line width of 2 cm, even if the intensity of the writing pressure of the user 1 exceeds the writing pressure corresponding to the line width of 2 cm. For example, in the settings of the line widths 300, a writing pressure of 500 gf corresponds to a line width of 5 cm, as illustrated in FIG. 8. Even if the user 1 with user ID "AA" in FIG. 11 draws a line with the writing pressure of 500 gf, however, the line is displayed with the line width of 2 cm, which is the maximum value.

As described above, the user 1 sets the minimum value and the maximum value of the line width in the second calibration. Thus, the width of the line varies within the range between the minimum value and the maximum value in accordance with the writing pressure.

In the second calibration, the minimum value and the maximum value of the width of the line to be displayed are set. Therefore, the line width determined in accordance with the writing pressure value corrected in the first calibration is further limited by the second calibration.

For example, it is assumed here that the user 1 with user ID "AA" sets −50 gf as the writing pressure correction value at the point a in the first calibration, as illustrated in FIG. 9, and that the user 1 sets 0.5 cm and 2 cm as the minimum value and the maximum value, respectively, of the line width in the second calibration, as illustrated in FIG. 11. In this case, if the writing pressure of the user 1 is 75 gf at the point a corresponding to the beginning portion of the line, the corrected writing pressure is 25 gf. As illustrated in FIG. 8, the writing pressure of 25 gf corresponds to a line width of 0.25 cm in the settings of the line widths 300. In this case, however, the minimum value of the line width is set to 0.5 cm by the user 1, and thus the line is displayed with the line width of 0.5 cm.

The process of the second calibration is completed when the user 1 presses a complete button with the electronic pen 100. Alternatively, the second calibration may be completed upon lapse of a predetermined time after the displaying of the setting screen for the second calibration starts.

After the completion of the process of the second calibration, the setting unit 240 stores the writing pressure correction values set in the first calibration in the writing pressure correction values 310 in association with the corresponding user ID. The setting unit 240 further stores the minimum value and the maximum value of the line width set in the second calibration in the minimum and maximum line width values 320 in association with the corresponding user ID.

If the user 1 presses a reset button with the electronic pen 100, the setting screen for the first calibration is displayed again. In this case, the user 1 again executes the first calibration and the second calibration to set the line width. This resetting method is illustrative, and thus the reset may be executed with a back button for returning to the immediately preceding step, or only one of the first calibration and the second calibration may be executed again.

The settings stored in the writing pressure correction values 310 and the minimum and maximum line width values 320 in association with the corresponding user ID are read by the line width determining unit 233 when the user 1 with the user ID logs in the electronic information board 10.

Referring back to FIG. 5, if the user 1 performs handwriting input on the touch panel 24, the line width determining unit 233 determines the line width based on the actual writing pressure of the user 1 measured by the pressure sensor 101.

The line width determining unit 233 basically increases the line width in accordance with the increase in the writing pressure of the user 1 measured by the pressure sensor 101 based on the definition set in the line widths 300. If the writing pressure correction value associated with the user 1 is set by the first calibration executing unit 241, however, the line width determining unit 233 corrects the actual writing pressure of the user 1 with the writing pressure correction value, and determines the line width based on the corrected writing pressure. Further, if the minimum value and the maximum value of the line width associated with the user 1 are set by the second calibration executing unit 242, the line width determining unit 233 determines the line width to be within the range between the minimum value and the maximum value thus set.

Specifically, if the user 1 draws a line on the touch panel 24, the line width determining unit 233 acquires, via the event signal determining unit 231, the writing pressure of the user 1 measured by the pressure sensor 101 of the electronic pen 100. The line width determining unit 233 further acquires the user ID from the user recognizing unit 232 as the identification information of the user 1. The line width determining unit 233 refers to the writing pressure correction values 310, and acquires therefrom the writing pressure correction value associated with the acquired user ID. The line width determining unit 233 corrects the actual writing pressure of the user 1 with the writing pressure correction value. The line width determining unit 233 refers to the line widths 300, and acquires therefrom the line width corresponding to the corrected writing pressure.

The line width determining unit 233 refers to the minimum and maximum line width values 320. Then, if the line width acquired from the line widths 300 is included in the range between the minimum value and the maximum value associated with the user ID of the user 1, the line width determining unit 233 determines to adopt the line width acquired from the line widths 300. If the line width acquired from the line widths 300 is less than the minimum value associated with the user ID of the user 1, the line width determining unit 233 determines to adopt, as the line width, the minimum value associated with the user ID of the user 1 set in the minimum and maximum line width values 320. If the line width acquired from the line widths 300 exceeds the maximum value associated with the user ID of the user 1, the line width determining unit 233 determines to adopt, as the line width, the maximum value associated with the user ID of the user 1 set in the minimum and maximum line width values 320.

For example, if the actual writing pressure of the user 1 at the position of the point a is 100 gf and the writing pressure correction value corresponding to the user ID of the user 1 registered in the writing pressure correction values 310 is −50 gf, the line width determining unit 233 calculates 50 gf as the corrected writing pressure. The line width determining unit 233 then acquires from the line widths 300 the line width of 0.5 cm corresponding to the corrected writing pressure of 50 gf. In the line width of 0.5 cm is included in the range between the minimum value and the maximum value associated with the user ID of the user 1, the line width determining unit 233 determines 0.5 cm as the line width at the position of the point a. The line width determining unit 233 further determines the line width at each of the positions of the remaining points b to d by performing a process similar to the one described above.

Herein, the trajectory drawn on the touch panel 24 by the user 1 is associated with the points a to d, which correspond to the predetermined positions set in the writing pressure correction values 310, in terms of the position in the trajectory. As described above, the position of the beginning portion of the trajectory corresponds to the point a, and the position corresponding to one-third of the trajectory from the beginning portion of the trajectory corresponds to the point b. Further, the position corresponding to two-thirds of the trajectory from the beginning portion of the trajectory corresponds to the point c, and the position of the end portion of the trajectory corresponds to the point d.

For example, it is assumed here that a trajectory with a length of 6 cm is obtained through the movement of the electronic pen 100 made by the user 1 from the touch of the electronic pen 100 on the touch panel 24 to the release of the electronic pen 100 from the touch panel 24. In this case, the position of the beginning portion of the trajectory corresponds to the point a, and the position 2 cm from the beginning portion of the trajectory corresponds to the point b. Further, the position 4 cm from the beginning portion of the trajectory corresponds to the point c, and the position of the end portion of the trajectory corresponds to the point d. The writing pressure at each of the positions of the points a to d is corrected with the writing pressure correction value for the corresponding one of the points a to d set in the writing pressure correction values 310.

The line width determining unit 233 thus determines the line widths at the points a to d, and determines line widths between the points a to d based on the line widths at the points a to d. For example, if the line width at the point a and the line width at the point b are 1 cm and 0.5 cm, respectively, the line width of an intermediate portion connecting the point a and the point b shifts from a width close to 1 cm to a width close to 0.5 cm toward the point b. The line width determining unit 233 transmits the determined line widths to the screen rendering unit 234.

The screen rendering unit 234 generates a graphic of the line handwritten by the user 1 based on the data of the position coordinates of the contact point of the electronic pen 100 input from the touch panel 24 via the event signal determining unit 231 and the line width acquired from the line width determining unit 233. The screen rendering unit 234 displays the generated graphic on the display screen 22 of the display 20. If an image is already displayed on the display screen 22, the screen rendering unit 234 displays the generated graphic as superimposed on the displayed image.

The screen rendering unit 234 thus displays, on the display screen 22, the trajectory input to the touch panel 24 by handwriting by the user 1 as the line having the line width determined by the line width determining unit 233.

Further, in response to a control signal from the first calibration executing unit 241, the screen rendering unit 234 displays a line in the line width display field 501 on the setting screen for the first calibration illustrated in FIG. 7 as the trajectory input by the user 1.

Referring back to FIG. 5, the screen display control unit 235 controls the image displayed on the display screen 22 of the display 20. If the user 1 operates one of the screen operation units 26 on the touch panel 24 with the electronic pen 100, the screen display control unit 235 acquires an event signal via the main control unit 220 as the information input by the user 1 through the operation. The screen display control unit 235 changes the image to be displayed on the display screen 22 in response to the operation performed by the user 1.

For example, if the user 1 presses the calibration button 26a in FIG. 6A (i.e., an example of one of the screen operation units 26) with the electronic pen 100, the screen display control unit 235 acquires, via the main control unit 220, a signal instructing to start the calibration. The screen display control unit 235 then displays the setting screen for the first calibration, as illustrated in FIG. 6B.

The screen display control unit 235 controls the image displayed on the display screen 22 based not only on the screen operation performed by the user 1 with the electronic pen 100 but also on a signal acquired from the setting unit 240. For example, if the first calibration executing unit 241 of the setting unit 240 determines the line widths to be displayed in the line width display field 501 on the setting screen illustrated in FIG. 7, the screen display control unit 235 displays the scale marks 502a to 502d at the respective positions in the line width adjustment field 502 indicating the line widths. The screen display control unit 235 further controls other processes such as screen transition following the completion of the first calibration and the second calibration.

The calibration process according to the thus-configured present embodiment will be described with reference to FIG. 12.

Figure 12:
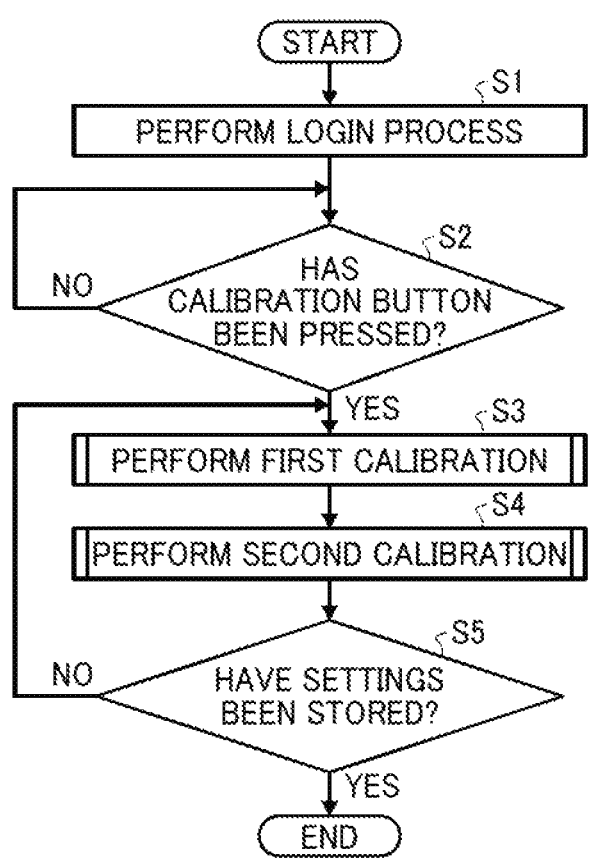
FIG. 12 is a flowchart illustrating an example of the procedure of a line width calibration process according to the embodiment.

FIG. 12 is a flowchart illustrating an example of the procedure of a line width calibration process according to the present embodiment. The processing of the flowchart starts after the power-on of the electronic information board 10 and the start-up of the display 20 and the controller 60, for example.

The user 1 of the electronic information board 10 holds the IC card 400 above the IC card reading device 25 to log in the electronic information board 10 (step S1). The IC card reading device 25 reads the user ID, i.e., the identification information, of the user 1 from the IC card 400, and transmits the identification information of the user 1 to the IC card I/F 250. The IC card I/F 250 transmits the acquired identification information of the user 1 to the main control unit 220. The user recognizing unit 232 acquires the identification information of the user 1 from the main control unit 220 via the event signal determining unit 231.

After the log-in process, the initial screen is displayed on the display screen 22, as illustrated in FIG. 6A. If the touch panel 24 detects that the calibration button 26a displayed in the display screen 22 has been pressed by the user 1 with the electronic pen 100 (YES at step S2), the first calibration executing unit 241 starts the process of the first calibration (step S3). If the touch panel 24 does not detect the pressing of the calibration button 26a (NO at step S2), the first calibration executing unit 241 does not start the process of the first calibration, and the touch panel 24 stands by for an operation by the user 1.

Details of the process of the first calibration will be described with reference to FIG. 13.

Figure 13:
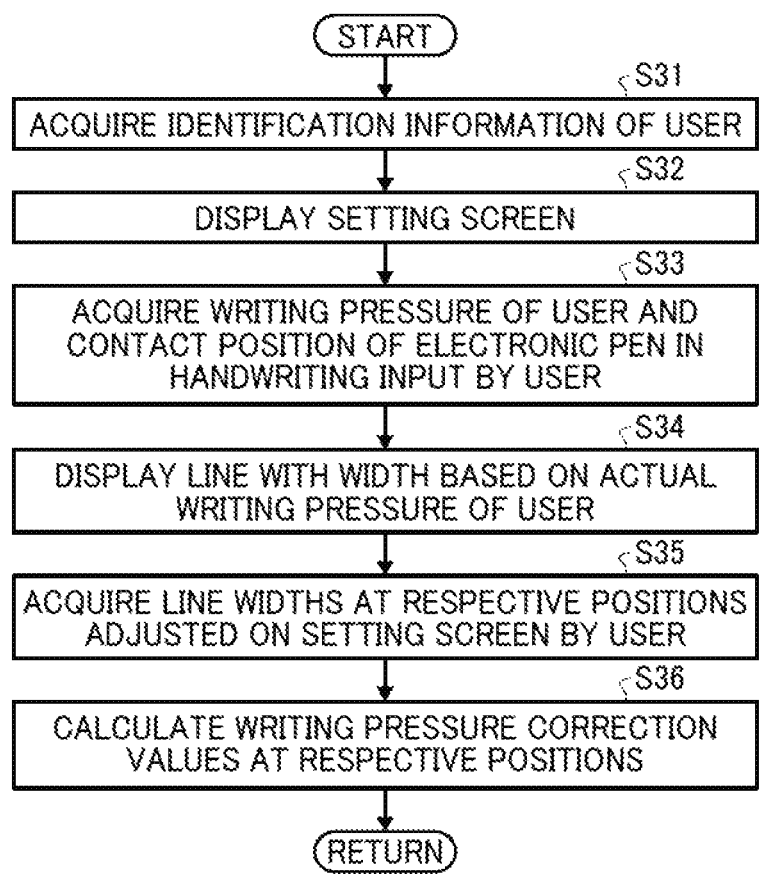
FIG. 13 is a flowchart illustrating an example of the procedure of a first calibration process according to the embodiment.

FIG. 13 is a flowchart illustrating an example of the procedure of the process of the first calibration according to the present embodiment. The first calibration executing unit 241 of the setting unit 240 acquires the user ID, i.e., the identification information, of the user 1 from the user recognizing unit 232 (step S31).

The screen display control unit 235 displays the setting screen for the first calibration on the display screen 22, as illustrated in FIG. 6B (step S32).

With the electronic pen 100, the user 1 inputs a trajectory by handwriting in the input area of the line width display field 501 on the displayed setting screen for the first calibration. The first calibration executing unit 241 acquires the position coordinates of the contact point of the electronic pen 100 detected by the touch panel 24 from the hardwiring input performed by the user 1 and the writing pressure of the user 1 measured by the pressure sensor 101 of the electronic pen 100 (step S33).

The first calibration executing unit 241 controls the screen rendering unit 234 to display, in the line width display field 501, a line having the width based on the actual writing pressure of the user 1, as illustrated in FIG. 7 (step S34).

The first calibration executing unit 241 controls the screen display control unit 235 to display, in the line width adjustment field 502, the scale marks 502a to 502d corresponding to the respective line widths at the positions of the points a to d in the line width display field 501. The user 1 adjusts the scale marks 502a to 502d with the electronic pen 100 to set the line width at each of the positions of the points a to d. The first calibration executing unit 241 acquires the line widths at the respective positions of the points a to d adjusted on the setting screen by the user 1 (step S35).

Based on the difference between the line width at each of the positions of the points a to d before being adjusted on the setting screen by the user 1 and the line width at the position after being adjusted on the setting screen by the user 1, the first calibration executing unit 241 calculates the writing pressure correction value at the position for the user 1 (step S36). Thereby, the process of the first calibration in FIG. 13 is completed, and the procedure returns to the processing of the flowchart in FIG. 12.

The second calibration executing unit 242 then starts the process of the second calibration (step S4).

Figure 14:
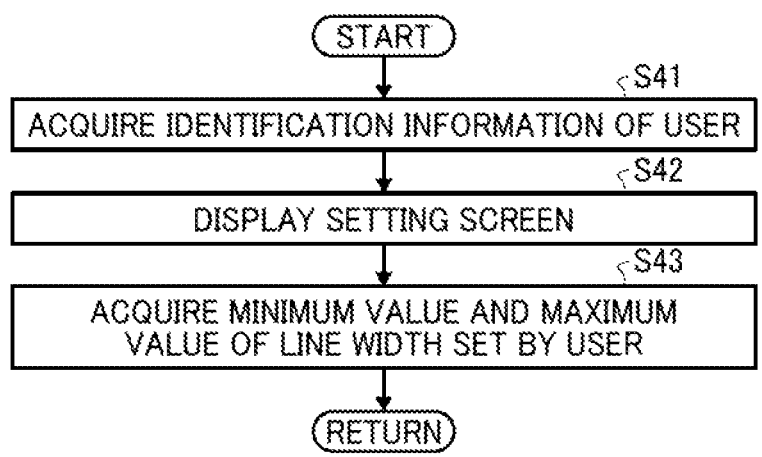
FIG. 14 is a flowchart illustrating an example of the procedure of a second calibration process according to the embodiment.

FIG. 14 is a flowchart illustrating an example of the procedure of the process of the second calibration according to the present embodiment. The second calibration executing unit 242 of the setting unit 240 acquires the user ID, i.e., the identification information, of the user 1 from the user recognizing unit 232 (step S41).

The screen display control unit 235 displays the setting screen for the second calibration on the display screen 22, as illustrated in FIG. 10 (step S42).

The user 1 operates the scale marks 503m and 503M in the line width setting field 503 with the electronic pen 100 to set the minimum value and the maximum value of the line width. The second calibration executing unit 242 acquires the minimum value and the maximum value of the line width set by the user 1 (step S43). Thereby, the process of the second calibration in FIG. 14 is completed, and the procedure returns to the processing of the flowchart in FIG. 12.

If the user 1 presses a complete button with the electronic pen 100, the setting unit 240 stores in the writing pressure correction values 310 the writing pressure correction values set in the first calibration, and stores in the minimum and maximum line width values 320 the minimum value and the maximum value of the line width set in the second calibration. Thereby, the settings of the line width for the user 1 are stored. If it is determined that the settings of the line width for the user 1 are stored (YES at step S5), the processing of the flowchart in FIG. 12 is completed.

If the user 1 presses a reset button with the electronic pen 100 and thus the settings of the line width for the user 1 are not stored (NO at step S5), the processes of the first calibration and the second calibration start again and continue to be repeated until the user 1 stores the settings of the line width (steps S3 and S4).

As described above, the electronic information board 10 according to the present embodiment includes the touch panel 24, the pressure sensor 101, the line width determining unit 233, the display screen 22, and the setting unit 240. The touch panel 24 receives handwriting input performed by the user 1. The pressure sensor 101 measures the writing pressure of the user 1 when the user 1 performs the handwriting input on the touch panel 24. The line width determining unit 233 determines the line width based on the writing pressure of the user 1 measured by the pressure sensor 101. The display screen 22 displays a line with the line width determined by the line width determining unit 233 as the trajectory of the handwriting input performed on the touch panel 24 by the user 1. In accordance with input from the user 1, the setting unit 240 sets the correction value for the line width at each of the predetermined positions in the trajectory of the handwriting input performed by the user 1. The line width determining unit 233 corrects the line width based on the correction value set by the setting unit 240.

According to the electronic information board 10 of the present embodiment, therefore, the trajectory input by the user 1 is displayed on the display screen 22 as corrected with the correction value preset by the user 1. That is, according to the electronic information board 10 of the present embodiment, the line is displayed with the desired width with no need for the user 1 to perform the operation of correcting the line width every time the user 1 performs handwriting input on the electronic information board 10. According to the electronic information board 10 of the present embodiment, therefore, the line intended by the user 1 is displayed on the display screen 22 of the display 20 without compromising user convenience.

When a user writes a character, for example, on a touch panel of a display, the writing pressure of the user generally tends to be increased at the beginning and the end of a line, and to be reduced in an intermediate portion of the line, particularly in cursive writing, for example. A typical image display apparatus that changes the width of the line to be displayed in accordance with the writing pressure of the user may fail to display the line intended by the user, displaying a line with a width not intended by the user or displaying a line as cut segments, for example.

The electronic information board 10 of the present embodiment, on the other hand, sets the correction value for the line width at each of the predetermined positions of the trajectory drawn by the user 1, which include the positions of at least the beginning portion, the intermediate portion, and the end portion of the trajectory. Therefore, the line is displayed with a set width, even if the writing pressure of the user 1 is unintentionally changed by the user 1. The electronic information board 10 of the present embodiment therefore prevents phenomena such as an excessive increase in the line width at the beginning portion and the end portion of the trajectory and an excessive reduction in the line width at the intermediate portion of the trajectory, which may lead to the disconnection of the line.

Further, in the electronic information board 10 of the present embodiment, the line width determining unit 233 increases the line width in accordance with the increase in the writing pressure of the user 1 measured by the pressure sensor 101. According to the electronic information board 10 of the present embodiment, therefore, the width of the line to be displayed is not previously fixed to a certain value, but is adjustable in accordance with the writing pressure applied during the drawing of the trajectory by the user 1.

Further, in the electronic information board 10 of the present embodiment, the setting unit 240 sets the writing pressure correction value for correcting the writing pressure of the user 1 measured by the pressure sensor 101, and the line width determining unit 233 determines the line width based on the value of the writing pressure of the user 1 measured by the pressure sensor 101 and corrected with the writing pressure correction value. That is, according to the electronic information board 10 of the present embodiment, the difference between the writing pressure necessary for the user 1 to draw a desired line and the writing pressure actually applied during the drawing of the trajectory by the user 1 is compensated by the writing pressure correction value. Consequently, the line is drawn with the desired width with no need for the user 1 to correct his or her handwriting or application of the writing pressure. Further, the electronic information board 10 of the present embodiment does not set the width of the line to be displayed per se. Accordingly, the electronic information board 10 of the present embodiment attains both the correction of the line width by the line width determining unit 233 and the adjustment by the user 1 of the width of the line drawn by the user 1 through the adjustment of the writing pressure applied during the handwriting input by the user 1.

Further, according to the electronic information board 10 of the present embodiment, the setting unit 240 individually sets the correction value of the line width for each user, and thus sets the correction value in accordance with the writing pressure of the individual user or the line width desired by the individual user. The electronic information board 10 of the present embodiment therefore prevents the display screen 22 from displaying a line with a line width unintended by the user 1.

The setting unit 240 of the electronic information board 10 of the present embodiment further sets the minimum value and the maximum value of the line width in accordance with the input from the user 1, and the line width determining unit 233 determines the line width within the range between the minimum value and the maximum value set by the setting unit 240. Even if the writing pressure of the user 1 is substantially reduced, therefore, the line is displayed with the width set to the minimum value, thereby preventing the discontinuation of the line. If the writing pressure of the user 1 is substantially increased, on the other hand, the line is displayed with the width set to the maximum value, thereby preventing the line from being displayed with a width greater than the width intended by the user 1.

Further, the setting unit 240 of the electronic information board 10 of the present embodiment individually sets the minimum value and the maximum value of the line width for each user, to thereby set the range of variation of the line width in accordance with the writing pressure of each user. If the writing pressure of the user 1 varies substantially, therefore, the range between the minimum value and the maximum value may be set to a narrow range to prevent a sharp change in the line width within a trajectory.

As described above, according to the electronic information board 10 of the present embodiment, the user 1 executes the first calibration and the second calibration as initial settings before using the electronic information board 10. This configuration allows the user 1 to draw a line with the width intended by the user 1 when using the electronic information board 10.

A program for executing the line width calibration process in the electronic information board 10 (i.e., the image display apparatus) according to the present embodiment is provided as preinstalled in a ROM, for example, or may be provided as recorded in a computer-readable recording medium, such as a compact disc-ROM (CD-ROM), a flexible disk (FD), a CD-recordable (CD-R), or a digital versatile disk (DVD), in an installable format file or in an executable format file.

Further, the above-described program may be stored in a computer connected to a network, such as the Internet, and may be provided as downloaded via the network. Further, the above-described program may be provided or distributed via a network, such as the Internet.

Further, the above-described program is divided into modules including the above-described functional units, which include the main control unit 220 and the application unit 230 including the event signal determining unit 231, the user recognizing unit 232, the line width determining unit 233, the screen rendering unit 234, the screen display control unit 235, and the setting unit 240 (i.e., the first calibration executing unit 241 and the second calibration executing unit 242). In actual hardware, a CPU (i.e., a processor) reads the program for executing line width calibration process from the ROM and executes the program, to thereby load and generate the respective units (i.e., the main control unit 220 and the application unit 230 including the event signal determining unit 231, the user recognizing unit 232, the line width determining unit 233, the screen rendering unit 234, the screen display control unit 235, and the setting unit 240 including the first calibration executing unit 241 and the second calibration executing unit 242) in a main storage device of the electronic information board 10.

Modified examples of the present embodiment will be described.

In the foregoing embodiment, the writing pressure and the line width are associated with each other as the standard settings of the electronic information board 10 based on the values registered in the table of the line widths 300, as described above. The configuration, however, is not limited thereto. For example, a function defining the relationship between the writing pressure and the line width may be provided to calculate the line width from the writing pressure based on the function.

In the foregoing embodiment, the electronic information board 10 sets the writing pressure correction value for each user (i.e., the user 1), corrects the actual writing pressure of the user 1 with the writing pressure correction value, and displays the line with the width based on the corrected writing pressure, to thereby display the line with the width intended by the user 1. The configuration, however, is not limited thereto. For example, instead of correcting the writing pressure, the electronic information board 10 may be configured to set a line width correction value for correcting the line width for each user, and correct the line width corresponding to the actual writing pressure of the user 1 based on the line width correction value, to thereby display the line with the corrected line width. The thus-configured electronic information board 10 is also capable of displaying the line with the width intended by the user 1.

In the foregoing embodiment, the electronic information board 10 has been described as an example of the image display apparatus. The technique of the foregoing embodiment, however, is not limited thereto, and is also applicable to a device including the touch panel 24 that receives handwriting input, such as a tablet information terminal, for example.

In the foregoing embodiment, the electronic pen 100 equipped with the pressure sensor 101 measures the writing pressure of the user 1. Alternatively, a pressure-sensitive touch panel may be employed as the touch panel 24 of the electronic information board 10. In this case, the electronic information board 10 measures the writing pressure with the touch panel 24, and thus is capable of measuring the writing pressure even if the user 1 draws a line with a stylus pen other than the electronic pen 100 or with a finger of the user 1, for example. With this configuration, therefore, the electronic information board 10 is capable of displaying the line on the display screen 22 with the line width intended by the user 1 even if the line is drawn by the user 1 without the dedicated electronic pen 100.

In the foregoing embodiment, the calibration button 26a is a digital button displayed on the display 20 by software. The calibration button 26a, however, is not limited thereto, and may be configured as a physical button provided to the electronic information board 10.

In the foregoing embodiment, the settings of the first calibration and the settings of the second calibration are stored after the first calibration and the second calibration are both completed. Alternatively, the settings of the first calibration and the settings of the second calibration may be separately stored to store the settings of the first calibration after the completion of the first calibration and store the settings of the second calibration after the completion of the second calibration.

In the foregoing embodiment, the line widths 300, the writing pressure correction values 310, and the minimum and maximum line width values 320 are stored in the HDD 64 of the electronic information board 10. Alternatively, the line widths 300, the writing pressure correction values 310, and the minimum and maximum line width values 320 may be stored in an external storage device connected to the electronic information board 10 by the network 204, or may be stored in a data-writable, non-volatile storage device other than the HDD 64, such as a flash memory, for example. The line widths 300 may be stored not in the HDD 64 but in the ROM 62.

In the foregoing embodiment, the first calibration and the second calibration are both performed. Alternatively, only one of the first calibration and the second calibration may be performed.

In the foregoing embodiment, the user 1 executes the first calibration and the second calibration as the initial settings before using the electronic information board 10. Alternatively, the electronic information board 10 may be configured to allow the user 1 to execute the first calibration and the second calibration after the start of the use of the electronic information board 10 to change the settings again, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the above-described steps are not limited to the order disclosed herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image display apparatus comprising:
a sensor to measure a writing pressure of a user in response to handwriting input performed on an input device by the user;
circuitry to determine a width of a line based on the measured writing pressure of the user; and
a display to display the line with the width determined based on the measured writing pressure, as a trajectory of the handwriting input performed on the input device by the user, and to display, for each predetermined position amongst a plurality of predetermined positions on the displayed line based on the trajectory of the handwriting, a control mark associated with the predetermined position, to permit the user to specify a change to the width of the displayed line at the predetermined position,
the circuitry setting, for each predetermined position amongst the plurality of predetermined positions on the displayed line, a correction value, determined based on the user-specified change for the predetermined position on the displayed line, to be applied at the predetermined position.

2. The image display apparatus of claim 1, wherein the plurality of predetermined positions include respective positions of at least a beginning portion, an intermediate portion, and an end portion of the trajectory of the handwriting input by the user.

3. The image display apparatus of claim 1, wherein the width of the line determined by the circuitry increases in accordance with an increase in the measured writing pressure of the user.

4. The image display apparatus of claim 1, wherein the correction value is a writing pressure correction value for correcting the measured writing pressure of the user, and
wherein after the correction value has been set by the circuitry, the circuitry determines a width of a line corresponding to input by the user, based on the measured writing pressure of the user corrected with the writing pressure correction value.

5. The image display apparatus of claim 1, wherein the circuitry individually sets the correction value for the user.

6. The image display apparatus of claim 1, wherein the circuitry sets a minimum value and a maximum value of the width of the line in response to input from the user, and determines the width of the line within a range between the set minimum value and the set maximum value.

7. The image display apparatus of claim 6, wherein the circuitry individually sets the minimum value and the maximum value of the width of the line for the user.

8. An image display apparatus controlling method comprising:
measuring a writing pressure of a user in response to handwriting input performed on an input device by the user;
determining a width of a line based on the measured writing pressure of the user;
displaying the line with the width determined based on the measured writing pressure, as a trajectory of the handwriting input performed on the input device by the user, and displaying, for each predetermined position amongst a plurality of predetermined positions on the displayed line based on the trajectory of the handwriting, a control mark associated with the predetermined position, to permit the user to specify a change to the width of the displayed line at the predetermined position,
setting, for each predetermined position amongst the plurality of predetermined positions on the displayed line, a writing pressure correction value, determined based on the user-specified change for the predetermined position on the displayed line, to be applied at the predetermined position;
acquiring a minimum value and a maximum value of the width of the line input by the user; and
storing the writing pressure correction value for the user and the minimum value and the maximum value of the width of the line for the user.

9. A non-transitory recording medium storing a program for causing a computer to execute an image display apparatus controlling method comprising:
measuring a writing pressure of a user in response to handwriting input performed on an input device by the user;
determining a width of a line based on the measured writing pressure of the user;
displaying the line with the width determined based on the measured writing pressure, as a trajectory of the handwriting input performed on the input device by the user, and displaying, for each predetermined position amongst a plurality of predetermined positions on the displayed line based on the trajectory of the handwriting, a control mark associated with the predetermined position, to permit the user to specify a change to the width of the displayed line at the predetermined position,
setting, for each predetermined position amongst the plurality of predetermined positions on the displayed line, a writing pressure correction value, determined based on the user-specified change for the predetermined position on the displayed line, to be applied at the predetermined position;
acquiring a minimum value and a maximum value of the width of the line input by the user; and
storing the writing pressure correction value for the user and the minimum value and the maximum value of the width of the line for the user.

* * * * *